United States Patent [19]

Schoenmeyr

[11] 4,333,119
[45] Jun. 1, 1982

[54] POWER MONITOR SYSTEM

[75] Inventor: Ivar L. Schoenmeyr, Laguna Niguel, Calif.

[73] Assignee: Purex Corporation, Lakewood, Calif.

[21] Appl. No.: 144,425

[22] Filed: Apr. 28, 1980

[51] Int. Cl.³ .............................................. H02H 3/00
[52] U.S. Cl. ....................................... 361/76; 361/77; 361/85; 361/90; 361/91; 361/92; 340/660
[58] Field of Search .................. 361/85, 76, 77, 59, 361/92, 91, 90, 84, 86; 340/660, 661, 662, 663

[56] References Cited

U.S. PATENT DOCUMENTS

| | | | |
|---|---|---|---|
| 3,535,591 | 10/1970 | Holmquest | 361/85 X |
| 3,571,707 | 3/1971 | Houck | 340/663 X |
| 3,678,499 | 7/1972 | McCarty | 340/660 X |
| 3,743,889 | 7/1973 | Lopez-Batiz | 361/85 X |
| 3,745,375 | 7/1973 | Huruse | 361/76 X |
| 3,778,801 | 12/1973 | Nudelmont | 340/660 X |
| 3,851,216 | 11/1974 | Clarke et al. | 361/77 X |
| 4,027,204 | 5/1977 | Norbeck | 340/663 X |
| 4,215,381 | 7/1980 | Heisinger | 361/119 X |

Primary Examiner—Reinhard J. Eisenzopf
Attorney, Agent, or Firm—William W. Haefliger

[57] ABSTRACT

Electrical apparatus to monitor electrical three-phase power includes circuitry to protect three-phase equipment from excessive variations in line voltage, phase to phase unbalance, and reverse phase sequencing; to protect personnel against automatic restart of equipment at return of line power; and protect power sources against overload at return of line power, after power interruptions.

17 Claims, 18 Drawing Figures

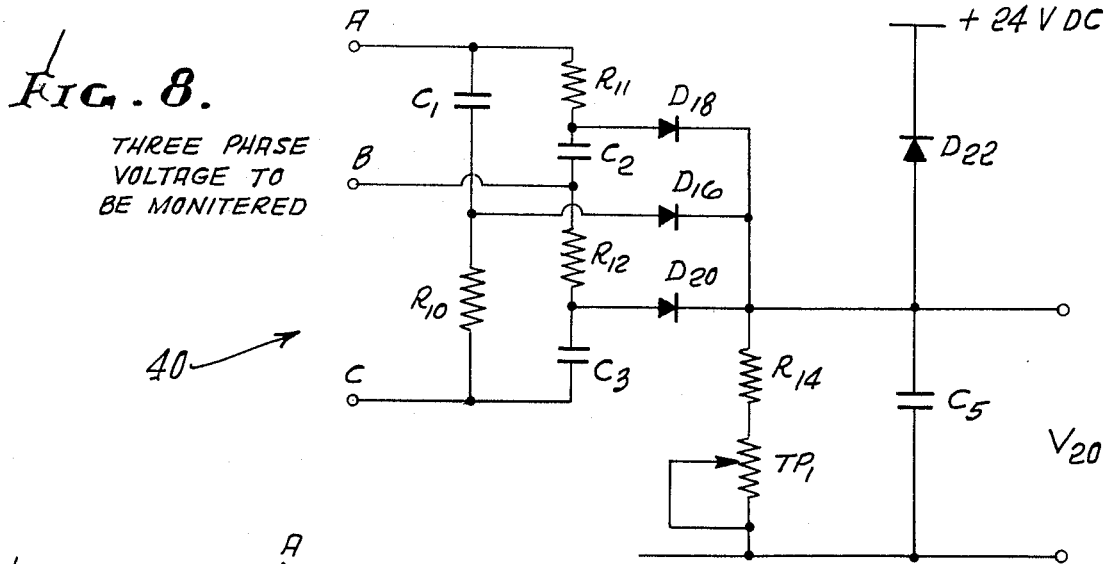
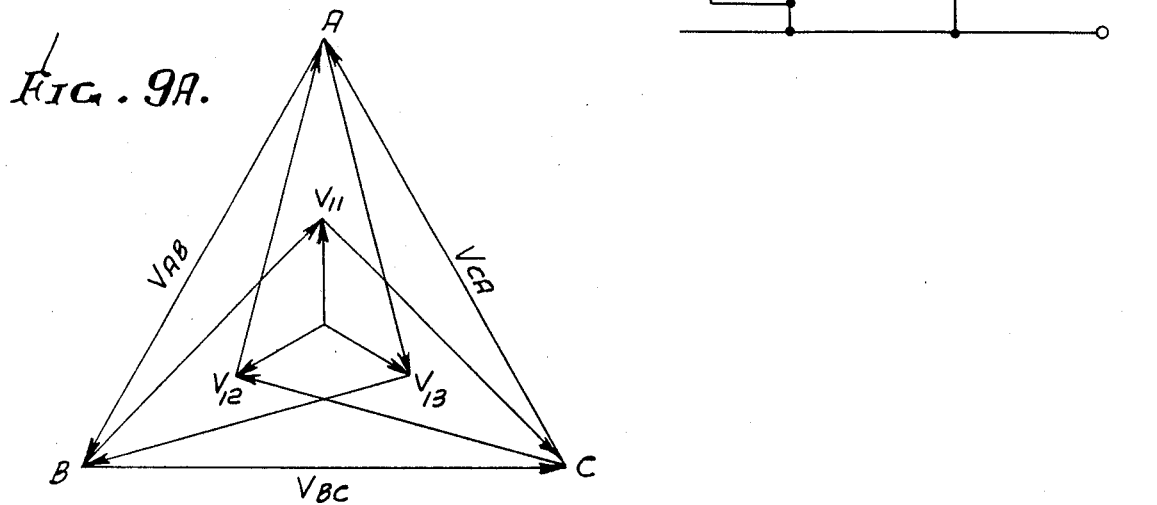
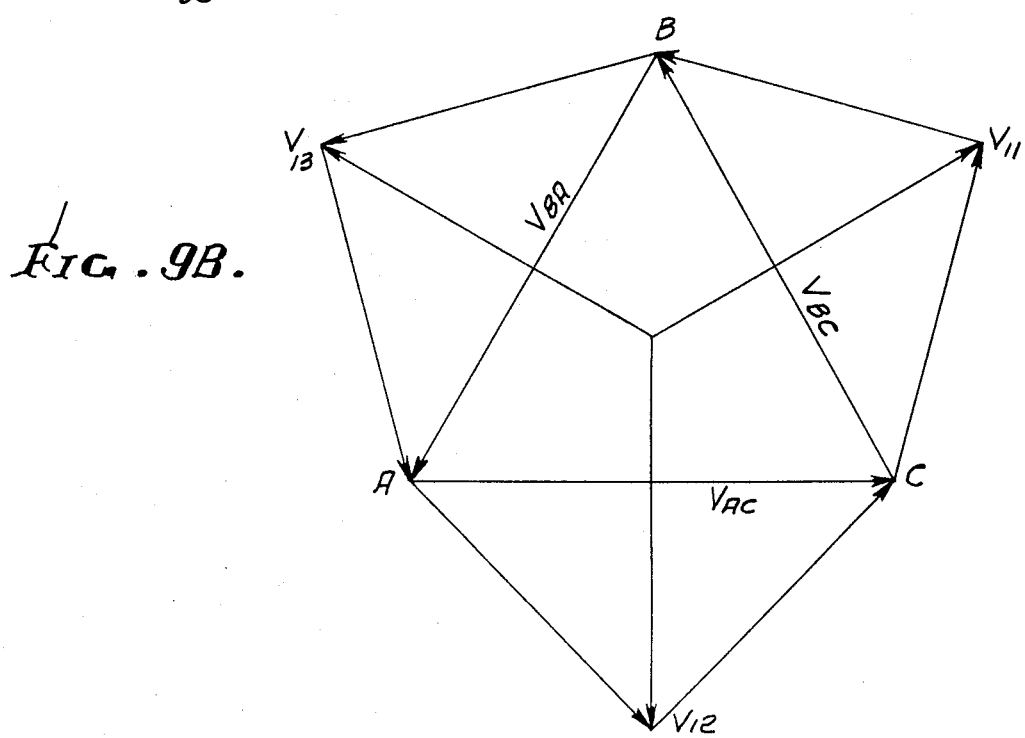

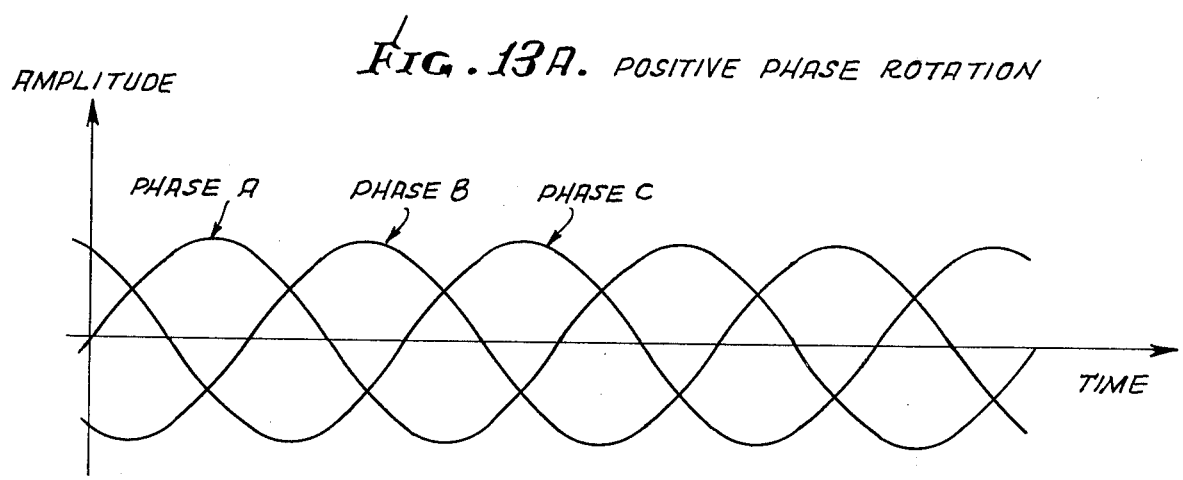
FIG. 13A. POSITIVE PHASE ROTATION
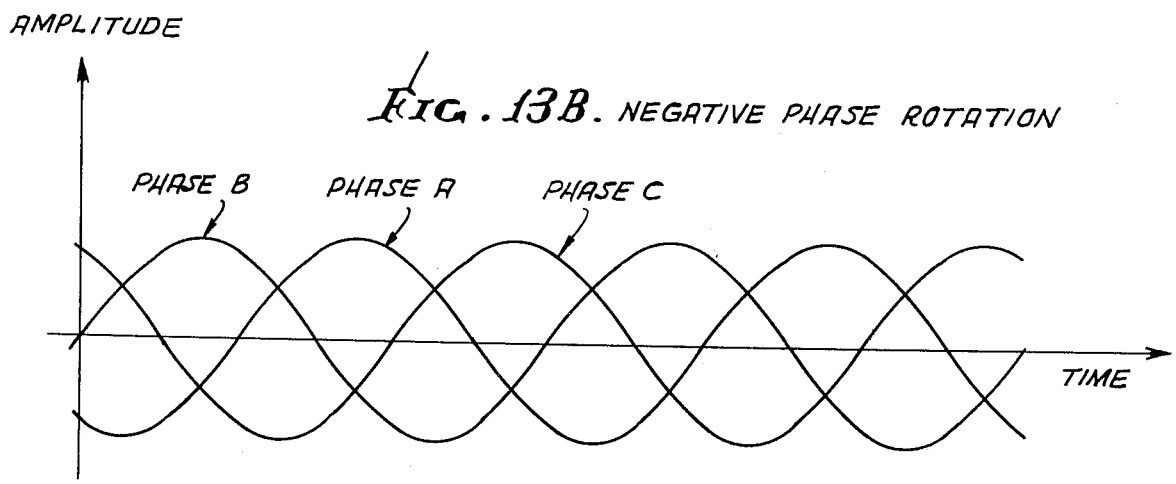
FIG. 13B. NEGATIVE PHASE ROTATION
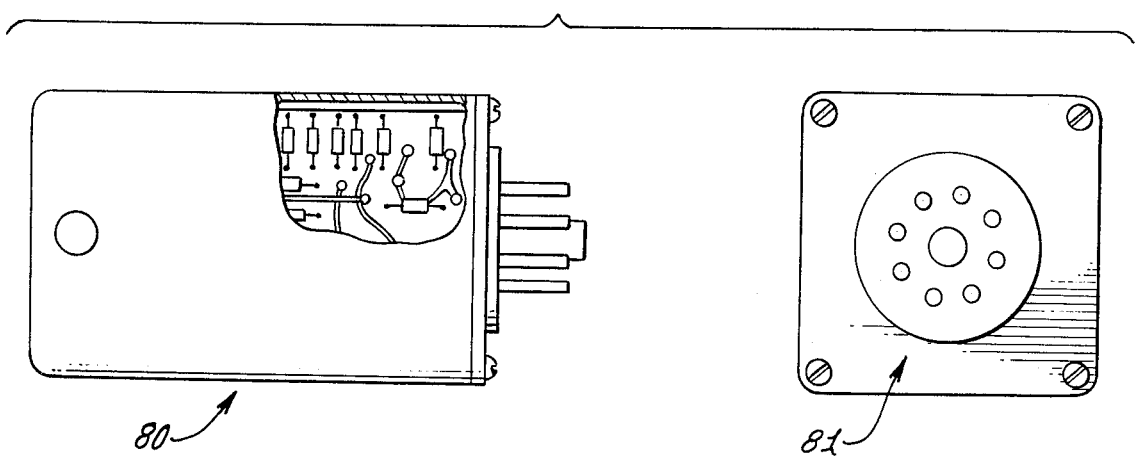
FIG. 15.

POWER MONITOR SYSTEM

BACKGROUND OF THE INVENTION

This invention relates generally to monitoring electrical three-phase power, and more particularly concerns protection of three-phase equipment from excessive variations in line voltage, phase to phase unbalance, and reverse phase sequencing. The invention also provides protection of personnel against automatic restart of equipment at return of line power, after power interruption. The invention further concerns protection of power sources such as generators and transformers against overload at return of line power, after power interruption; and, detection of fault condition by separate indicator lights for over-voltage; under-voltage, phase unbalance, and improper phase sequence.

In the operation of three-phase motors, voltage less than the designated voltage results in higher load current. The heat generated due to resistance losses in the windings increases proportionally to the current squared, and may damage the insulation system. Also, unbalance of a three-phase power system will occur when single phase loads are applied, causing one or two of the lines to carry more or less of the load. Loss of one of the three phases is an extreme case of phase unbalance. This condition is generally known as single phasing. Excessive phase voltage unbalance causes three-phase motors to run at temperature beyond their designed ratings. These high temperatures soon result in insulation breakdown and shortened motor life. Further, three-phase motors will rotate clockwise for positive phase sequence and counterclockwise for negative phase sequence. In many applications, only one direction of rotation is permitted. Reverse rotation may damage equipment designed only to run forward.

Accordingly, there is a need for compact, simple, plug-in apparatus to be used in three-phase circuitry to detect overvoltage, undervoltage, phase unbalance and reverse rotation, and return of power after interruption, and to trip circuit breaker apparatus pursuant to such detection.

SUMMARY OF THE INVENTION

A major object of the invention is to provide a single compact monitoring apparatus that will transmit a fault single in case of:

(1) Overvoltage—(the average voltage exceeds a present limit); and/or (2) Undervoltage—(the average voltage falls below a present limit); and/or (3) Phase unbalance—(the difference between any one phase and the average voltage exceeds a present limit); and/or (4) Improper phase sequencing—(reverse rotation), and/or (5) Return of line power after power outage.

As will be seen, the apparatus to monitor electrical three-phase power typically comprises, in combination:

(a) a three-phase voltage averaging detector to continuously monitor three-phase voltage, and to generate a DC voltage output ($V_{10}$) that is directly proportional to the average phase voltage, independent of phase sequence, and that is also inversely proportional to unbalance between any two phases, (b) a high voltage comparator circuit operatively connected with the $V_{10}$ output of the three-phase voltage averaging detector to compare the signal $V_{10}$ with a reference signal $V_{15}$, thereby to produce an output signal $V_{40}$, (c) and a low voltage comparator circuit operatively connected with output $V_{10}$ of the three-phase voltage averaging detector and also with a reference signal $V_{16}$ thereby to produce an output $V_{50}$, (d) and a fault signal activator circuit coupled to $V_{40}$ and $V_{50}$ to produce a fault signal in the event either of $V_{40}$ and $V_{50}$ reaches a corresponding limit.

Further, a three-phase voltage and phase sequence detector is typically employed to continuously monitor the three-phase voltage and to generate a floating reference voltage $V_{20}$ that is proportional to the average three-phase voltage, that is also proportional to the unbalance between any two phases, and that is high for reverse rotation. Also, a phase unbalance and reverse phase sequence comparator circuit may be provided to be operatively connected to receive the $V_{10}$ and $V_{20}$ outputs, and to produce an output $V_{30}$ fed to the input of the fault signal activator circuit, whereby a predetermined low value of $V_{30}$ will cause production of a fault signal.

Another object of the invention to provide a monitoring device intended to be used together with an overload circuitbreaker that has voltage sensing coils in addition to its current sensing coils. As will be seen, the fault signal from the monitoring device energizes the voltage sensing coil causing the circuitbreaker to trip, interrupting the flow of electricity from the generating source to the powered equipment. Typically, the monitoring and controlling system is of compact and light-weight construction enabling its use with portable three-phase equipment. Also, the monitoring device is typically of a plug-in type; and if the monitoring device is removed, the equipment remains operable without need for rewiring of the controller. Further, the monitoring device will typically be equipped with four alarm lights indicating: overvoltage, undervoltage, phase unbalance, and improper phase sequence.

These and other objects and advantages of the invention, as well as the details of illustrative embodiment, will be more fully understood from the following description and drawings in which:

DRAWING DESCRIPTION

FIG. 8 is a circuit showing a three-phase voltage and phase detector;

FIGS. 9A and 9B are phasor diagrams;

FIGS. 13A and 13B are wave form diagrams;

FIG. 15 shows plug in module and socket elements; and

DETAILED DESCRIPTION

Three-phase electrically powered equipment is designed to operate under a given normal voltage. Small fluctuations can normally be tolerated but will, if excessive, cause damage to the powered equipment. The present invention relates to apparatus for monitoring the electrical power and disconnecting the equipment from the power source if certain preset limits are exceeded. Parameters to be monitored are listed in the following description.

Overvoltage—results in high inrush current during start-up of rotating electrical equipment. High inrush current in turn generates proportionally even higher temperatures that may damage the insulation system. High voltage may also cause magnetic saturation resulting in excessive temperatures and consequential insulation breakdown. If the voltage exceeds the dielectric strength of the insulating material, the insulation system will likewise be destroyed.

Figure 1:
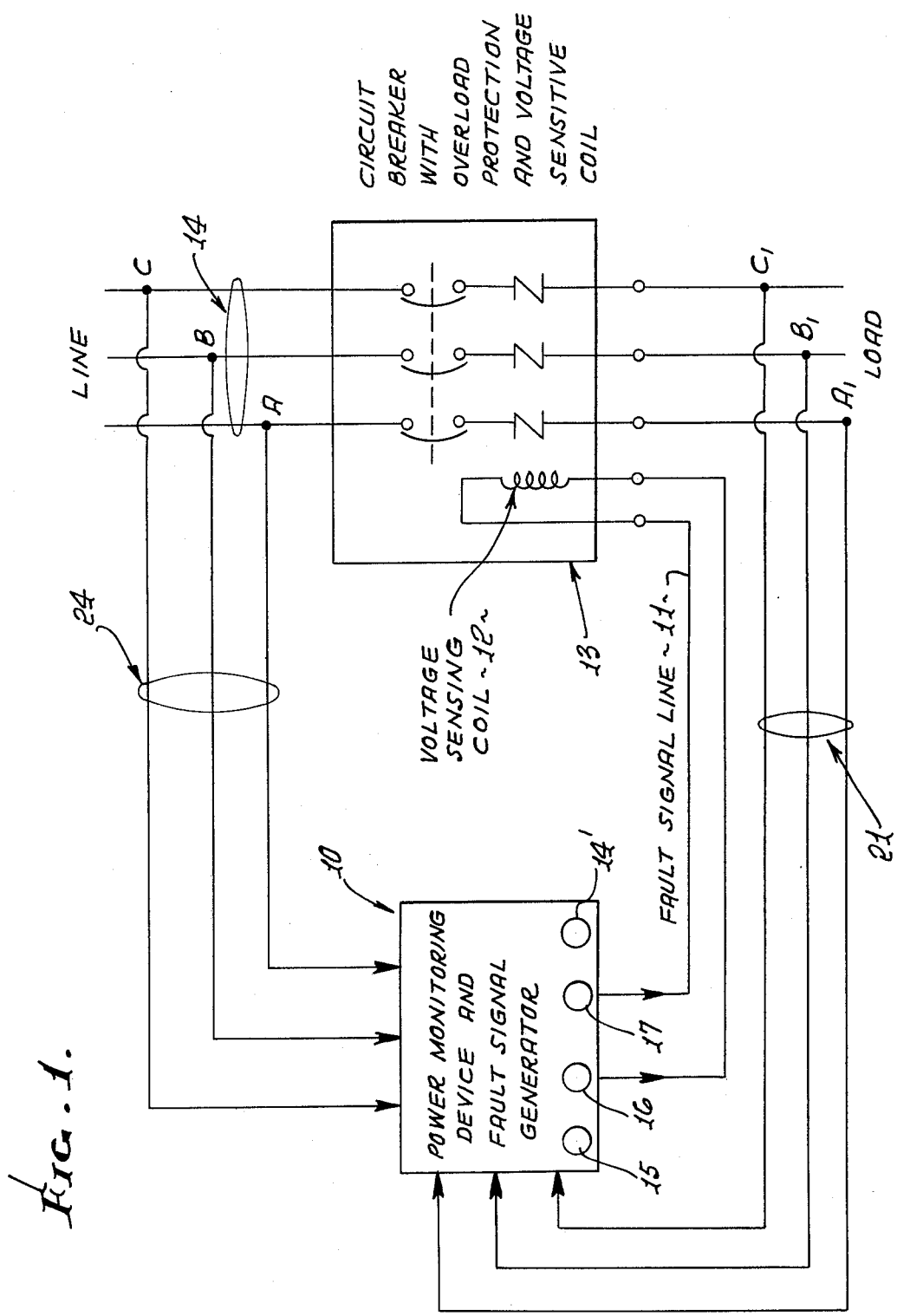
FIG. 1 is a circuit diagram showing a three-phase equipment protective system, power monitor and circuit breaker.

The power monitor shown at 10 in FIG. 1 compares three-phase voltage against a preset upper limit. If the limit is exceeded, a fault signal is generated in line 11 to energize a voltage sensitive coil 12 in a circuit breaker 13 for disconnecting the load. The power monitor may also have an integral warning light 14' which will glow if the voltage is excessive. The alarm light warns the operator that there is a fault in the three-phase power generating system that must be corrected before attempting restart. The three-phase line is indicated generally at 14.

Undervoltage—As previously stated, in three-phase motors, voltage less than the designated voltage results in higher load current. The heat generated due to resistance losses in the windings increases proportionally to the current squared, and may damage the insulation system. The power monitor 10 compares three-phase voltage against a preset lower limit. If the voltage falls below this limit, a fault signal is generated to energize voltage sensitive coil 12 in the circuit breaker, connecting the load. The power monitor also has an integral warning light 15 which will glow if the voltage is too low. The alarm light warns the operator that there is a fault in the three-phase generating system that must be corrected before attempting restart.

Phase unbalance—Unbalance of a three-phase power system will occur when single phase loads are applied, causing one or two of the lines to carry more or less of the load. Loss of one of the three-phases is an extreme case of phase unbalance. This condition is generally known as single phasing. Excessive phase voltage unbalance causes three-phase motors to run at temperatures beyond their designed ratings. These high temperatures soon result in insulation breakdown and shortened motor life.

The power monitor 10 also senses phase unbalance, and generates a fault signal in line 11 if the unbalance exceeds a preset limit. The fault signal is intended to energize the voltage sensitive coil 12 in the circuit breaker, disconnecting the load. The power monitor also has an integral warning light 16 which will glow if the phase unbalance is excessive. The alarm light warns the operator that there is a fault in the three-phase generating system that must be corrected before attempting restart.

Negative phase sequence—In a three-phase system with phase voltages shown at A, B and C, phase B may either be +120° or −120° from phase A (FIG. 13A and FIG. 13B). Three-phase motors will rotate clockwise for positive phase sequence and counter clockwise for negative phase sequence. In many applications, only one direction of rotation is permitted. Reverse rotation may damage equipment designed only to run forward. The power monitor 10 also senses phase sequence and generates a fault signal if the phase sequence is improper. The fault signal energizes a voltage sensitive coil as at 12 on a circuitbreaker, disconnecting the load. The power monitor also has an integral warning light 17 which will glow if the phase sequence is improper. The alarm light warns the operator that there is a fault in the three-phase power generating system that must be corrected before attempting restart.

Figure 2:
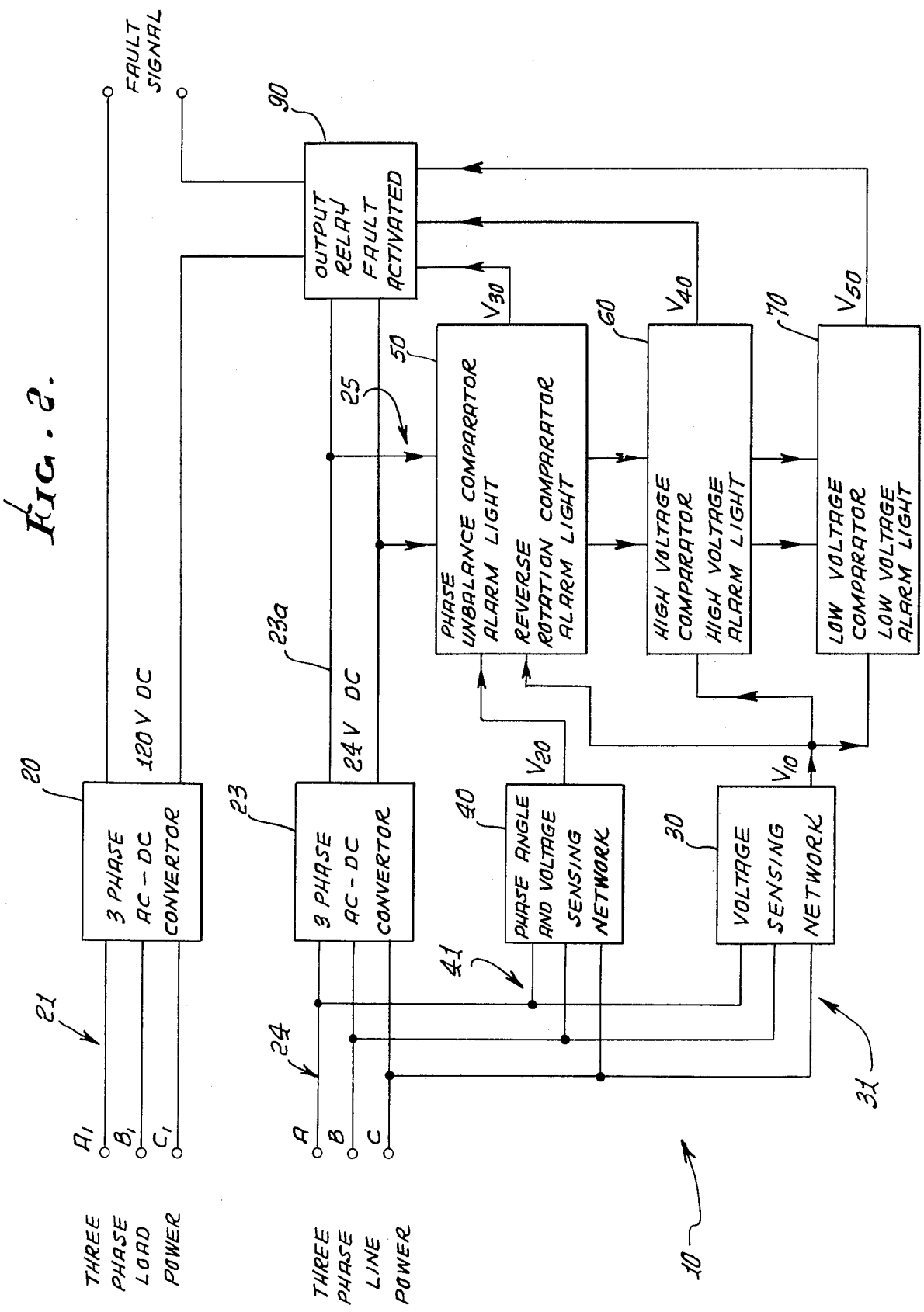
FIG. 2 is a circuit block diagram showing a power monitor and fault signal generator.

The power monitor and fault signal transmitter is typically an integral unit, and a block diagram of same is shown in FIG. 2.

Figure 5:
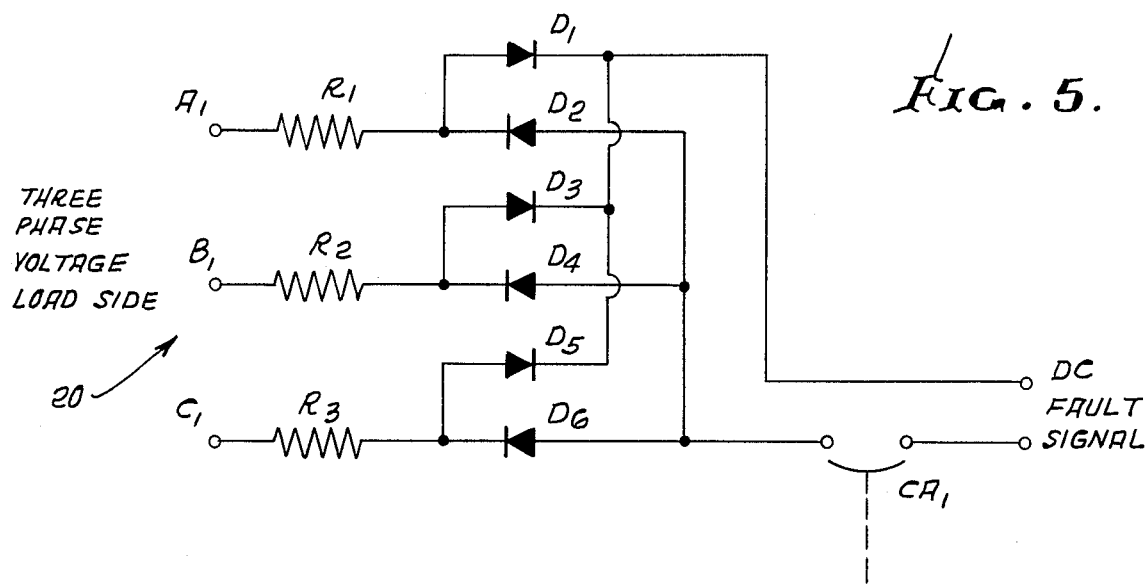
FIG. 5 is a circuit showing a three-phase AC-DC convertor fault signal generator.

A three-phase AC-DC converter 20 (FIGS. 2, 5 and 14) incorporated in the monitor 10 is connected at 21 to the load side of a circuitbreaker 13 (FIG. 1). This implies that a fault signal can only be generated when the circuitbreaker is closed. When the circuit breaker opens, disconnecting the load, the fault signal is automatically interrupted. FIG. 5 shows the details of a typical device. Diodes $D_1$, $D_2$, $D_3$, $D_4$, $D_5$, $D_6$ are connected as shown so as to form a three phase full wave rectifier. Resistors $R_1$, $R_2$, $R_3$ act as current limiters. The relay contact CA 1 is normally closed and will open when relay coil $L_1$ is energized. The three-phase rectifier provides power even if any one phase is grounded or open, permitting a fault signal to be generated in the event of single-phasing.

Figure 6:
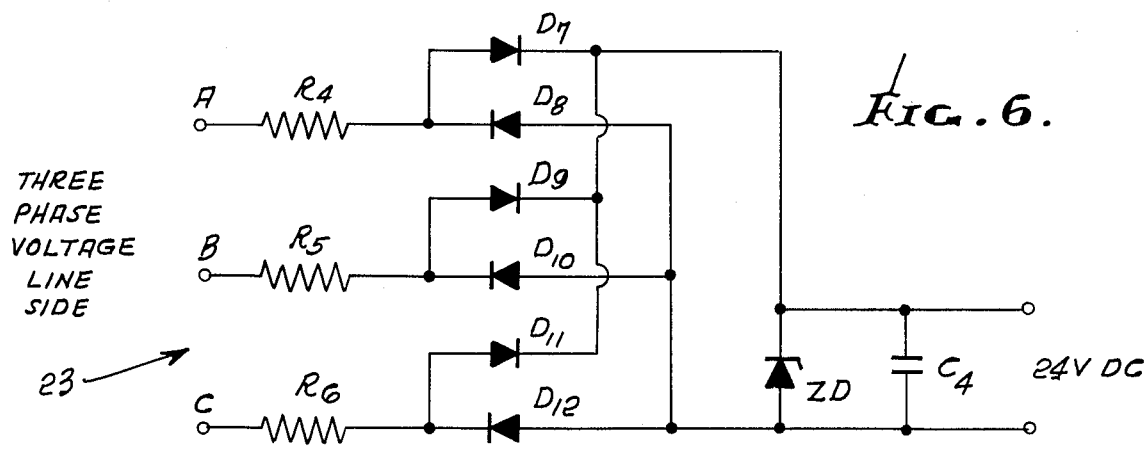
FIG. 6 is a circuit showing a three-phase AC-DC convertor 24 volt DC power supply.

A three-phase AC-DC converter 23 (FIGS. 2, 6 and 14) also incorporated in monitor 10 is connected at 24 to the line side of a circuitbreaker 13 (FIG. 1). The converter 23 provies 24 V DC operating voltage at output side 23a to the comparator circuits (operational amplifiers) via leads 25, and also to the output relay and fault indicating light circuit 21. FIG. 6 shows the details of the AC-DC converter 23. Diodes $D_7$, $D_8$, $D_9$, $D_{10}$, $D_{11}$, $D_{12}$ are connected to form a three-phase full wave bridge rectifier. Zener diodes $Z_D$ and capacitor $C_4$ are sized and connected across the bridge to define the voltage and reduce the ripple to less than 2%. Resistors $R_4$, $R_5$ $R_6$ act as current limiters.

A three-phase voltage averaging detector or sensing network 30 (FIGS. 2, 7 and 14) incorporated in monitor 10 is connected at 31 to the line side of the circuitbreaker 13 (FIG. 1), and will continuously monitor the three-phase voltage. A DC voltage $V_{10}$ is generated by network 30 that is:

(a) proportional to the average three-phase voltage (independent of phase sequence)

(b) inversely proportional to unbalance between any two phases.

Figure 7:
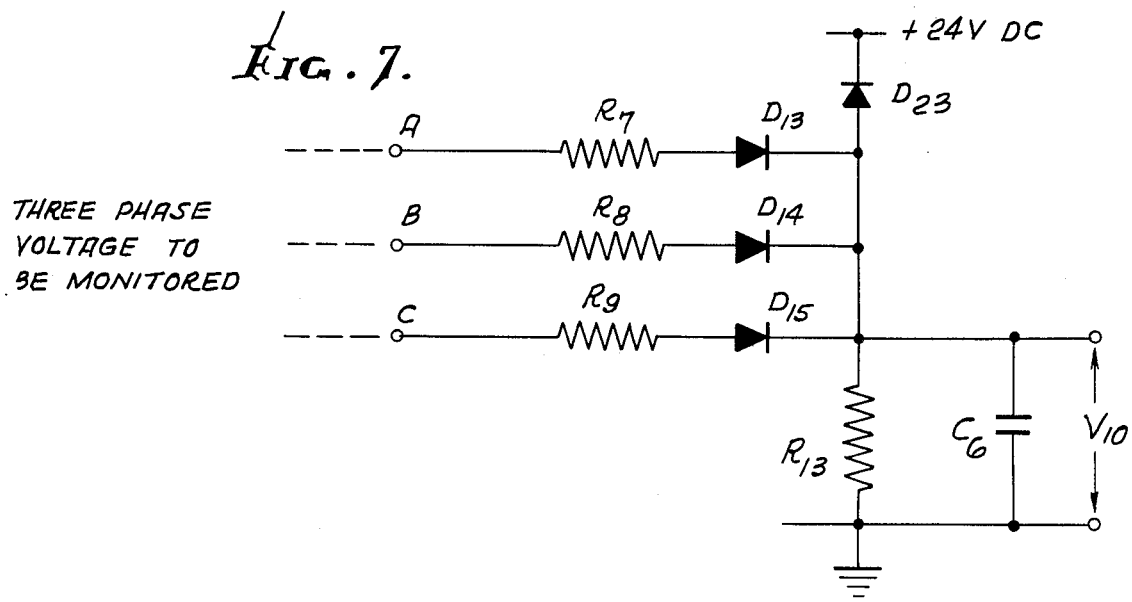
FIG. 7 is a circuit showing a three-phase voltage averaging detector.

FIG. 7 shows the details of the three-phase voltage averaging detector 30. Parallel resistors $R_7$, $R_8$, $R_9$, $R_{10}$; parallel diodes $D_{13}$, $D_{14}$, $D_{15}$, $D_{16}$; and capacitor $C_6$ are connected as shown to generate a DC signal $V_{10}$ proportional to the average three-phase voltage. $R_7$, $R_8$ $R_9$ are to be of equal resistance. Filter capacitor $C_6$ is sized to reduce the ripple to less than 2%. $D_{23}$ limits the voltage generated to 24 volts, maximum.

A three-phase voltage, phase unbalance sequence detector 40 (see FIGS. 2, 8 and 14) (also incorporated in monitor 10) is connected at 41 to the line side of circuit-breaker 13 (FIG. 1) and continuously monitors the three-phase voltage. A DC voltage $V_{20}$ is generated by detector 40 that is (a) proportional to the average three-phase voltage (variable 0–24 V DC)

(b) proportional to the unbalance between any two phases (variable 0–24 V DC)

(c) high (approximately 24 V) for reverse rotation.

This output $V_{20}$ is used as a floating reference standard to be compared with $V_{10}$. $V_{10}$ and $V_{20}$ will vary equally in response to variations in a balanced three-phase voltage. Unbalance will increase $V_{20}$ but decrease $V_{10}$. A preset nominal difference between $V_{20}$ and $V_{10}$ (adjusted by trim potentiometer $TP_1$) will represent the unbalance that may be tolerated. FIG. 8 shows the details of the three-phase voltage, phase unbalance and phase sequence detector 40. Resistors and capacitors $R_{10}$ and $C_1$; $R_{11}$ and $C_2$; and $R_{12}$ and $C_3$; are connected to form three identical RC circuits. The reactances of the capacitors are chosen to be the same at 60 HZ as the resistance of the resistors in the network. Six branches are shown, and variously connected between the three input phases and one or the other output terminals for $V_{20}$.

The output of the RC network, phasors $V_1$, $V_2$, $V_3$, are rectified and averaged together by diodes $D_{16}$, $D_{18}$, $D_{20}$, and capacitor $C_5$ to produce a DC signal $V_{20}$. The amplitude of $V_{20}$ is determined by resistor $R_{14}$ and trim potentiometer $TP_1$. For balanced positive phase sequence, the three phasors $V_{11}$, $V_{12}$, $V_{13}$ will be of minimum amplitude (FIG. 9A). The output DC voltage $V_{20}$ will consequently also be at a minimum. If the measured three-phase AC voltage is balanced, $V_{20}$ will be proportional to be amplitude of the three-phase voltage. Diode 22 limits $V_{20}$ to 24 volts, maximum.

A phase unbalance will increase the output DC voltage $V_{20}$. For balanced negative phase sequence, the three phasors $V_{11}$, $V_{12}$, $V_{13}$ will be of maximum amplitude (see FIG. 9B). The output DC voltages $V_{20}$ will consequently also be at a maximum.

Figure 10:
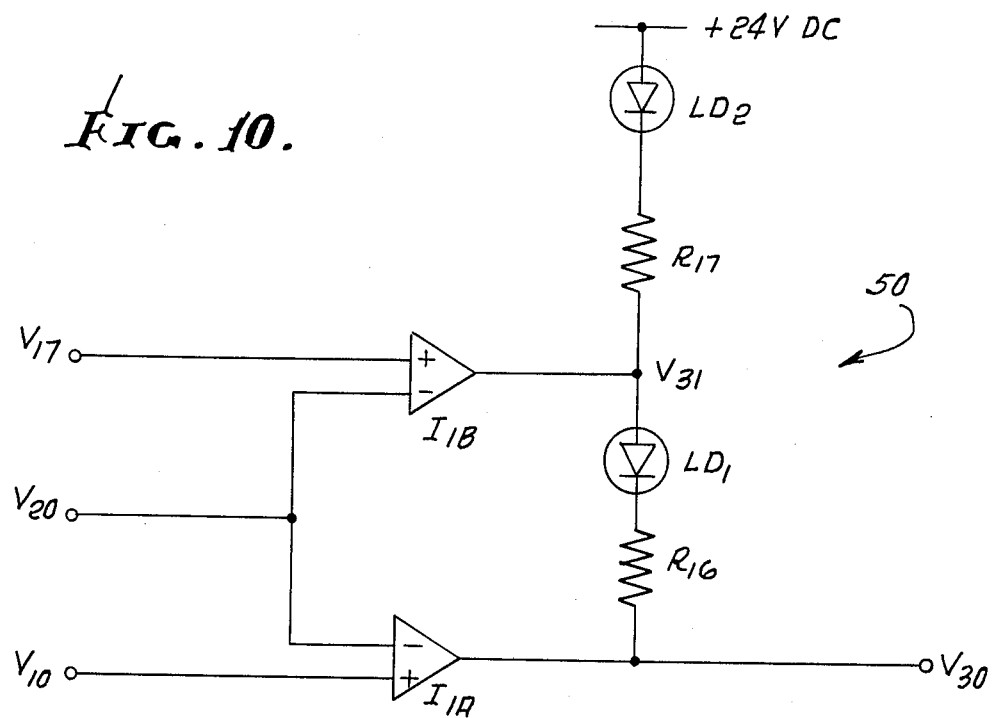
FIG. 10 is a comparator circuit for phase unbalance and reverse phase sequence.

A comparator circuit 50 for phase unbalance and reverse phase sequences (FIGS. 10 and 14) receives the signal $V_{10}$ from the three-phase voltage averaging detector 30 for comparison with $V_{20}$, the signal from the three-phase voltage and phase sequence detector 40, and a reference signal $V_{17}$. See FIGS. 2 and 4 in this regard.

The output $V_{30}$ from the differential amplifier $I_{1A}$ is either high (approximately 24 V DC) or low (approximately 1 V DC) depending on whether the differential between $V_{10}$ and $V_{20}$ is positive or negative. The trim potentiometer $TP_1$ seen in FIG. 8 is adjusted so that $V_{20}$ is equal to $V_{10}$ at a desired phase unbalance level. For normal conditions (phase balance, $V_{10}$ will then be larger than $V_{20}$ and the output $V_{30}$ will be high. For excessive phase unbalance $V_{20}$ is larger than $V_{10}$ and the output $V_{30}$ will be low. Phase reversal (negative phase sequence) will generate a $V_{20}$ of maximum amplitude. $V_{17}$ is chosen to be slightly lower than $V_{20}$ maximum so that $V_{20}$ is higher than $V_{27}$ at negative phase sequence. Note indicator light $LD_1$ connected between the outputs of the two amplifiers $I_{1B}$ and $I_{1A}$. Note also indicator light $LD_2$. The following truth table applies:

| Phase Rotation | Input AC Voltage | V10, V20, V17 | V30 | V31 | LD1 | LD2 |
|---|---|---|---|---|---|---|
| + | Balanced | $V_{10} > V_{20} < V_{17}$ | High | High | Off | Off |
| + | Balanced | $V_{10} < V_{20} < V_{17}$ | Low | High | On | Off |
| − | Reversed | $V_{10} < V_{20} > V_{17}$ | Low | Low | Off | On |

Figure 11:
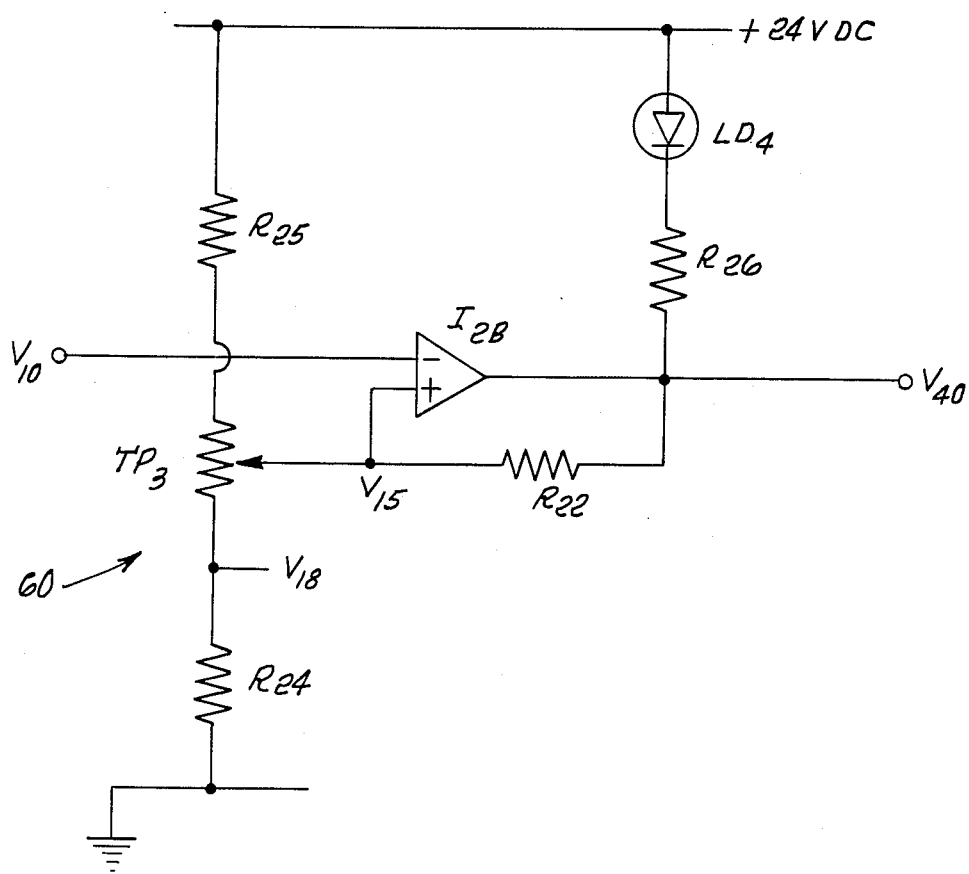
FIG. 11 is a high voltage comparator circuit.

A comparator circuit 60 for high voltage (FIGS. 11 and 14) receives the signal $V_{10}$ from the phase average voltage detector 30 for comparison with a reference signal $V_{15}$ adjustable by trim potentiometer $TP_3$. The output $V_{40}$ from the operational amplifier $I_{2B}$ is either high or low depending on whether the differential between $V_{10}$ and the reference signal is positive or negative. The trim potentiometer $P_2$ is adjusted for the desired maximum voltage level.

A feedback loop consisting of $R_{22}$ lowers the voltage $V_{15}$ somewhat when $V_{40}$ goes low, stabilizing the comparator by introducing hysteresis around the switchpoint. Indicator light $LD_4$ (high voltage warning light) is energized when $V_{40}$ goes low indicating high voltage ($V_{10}$ is higher then the reference signal).

Figure 12:
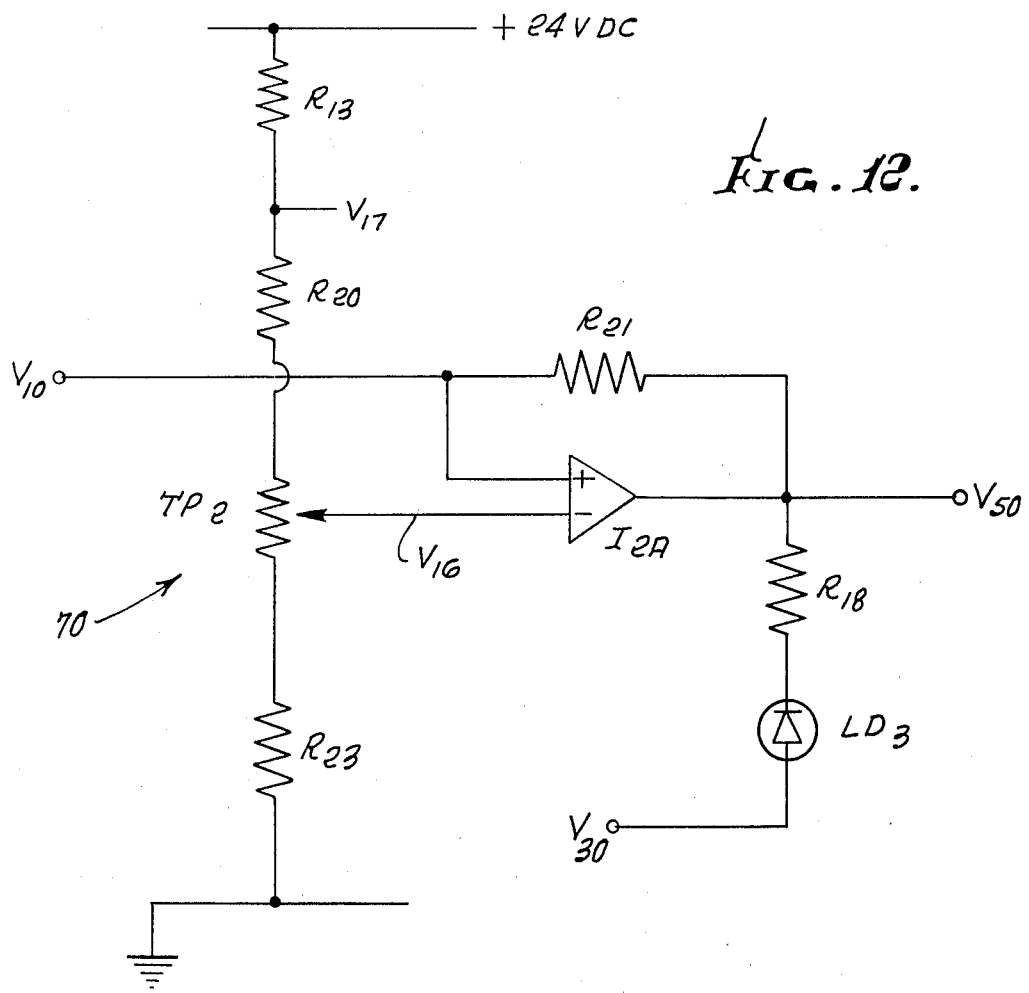
FIG. 12 is a low voltage comparator circuit.

A comparator circuit 70 for low voltage (FIGS. 12 and 14) compares the signal $V_{10}$ with a reference signal $V_{16}$. The output $V_{50}$ either high or low depending on whether the differential between $V_{10}$ and $V_{16}$ is positive or negative. The trim potentiometer $TP_2$, is adjusted for the desired minimum voltage. The feedback loop consisting of $R_{21}$ lowers the voltage $V_{16}$ somewhat when $V_{50}$ goes low stabilizing the comparator by introducing hysteresis around the switch point.

Indicator light $LD_3$ (low voltage warning light) is energized when $V_{50}$ goes low, indicating low voltage. $V_{30}$ is normally high, but will go low for phase unbalance. $LD_3$ is connected so that it will not be energized when there is phase unbalance (low voltage is only one or two phases).

Figure 16:
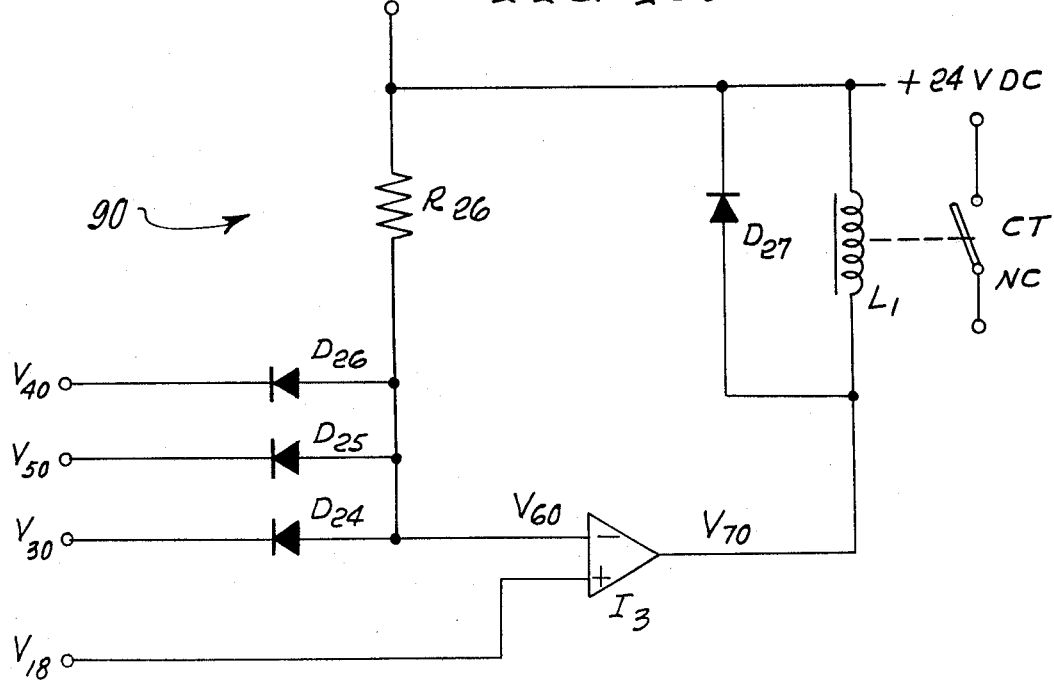
FIG. 16 is a fault signal activator circuit.

A fault signal activator 90 (FIG. 16) monitors the output $V_{40}$ of the high voltage comparator circuit, the output $V_{50}$ of the low voltage comparator circuit and the output $V_{30}$ of the comparator circuit for phase unbalance and reverse phase sequences. These outputs are connected thru diodes $D_{26}$, $D_{25}$ and $D_{24}$ respectively to the negative input $V_{60}$ of differential amplifier $I_3$. $V_{18}$ is a reference signal chosen to be approximately 11 VDC. Under normal conditions. $V_{40}$ and $V_{50}$ and $V_{30}$ will be high allowing $V_{60}$ to be high (approximately 24 VDC). When $V_{60}$ is higher than reference signal $V_{18}$, it causes differential amplifier output $V_{70}$ to be low, energizing relay coil $L_1$, opening the normally closed contact CT. If any one of $V_{40}$, $V_{50}$, or $V_{30}$ goes low, $V_{60}$ is forced low and $L_1$ is de-energized, closing the contact CT.

If the comparator output $V_{70}$ is low, it will energize relay coil $L_1$, opening contact CT. This indicates a normal condition, and no fault signal will go to the circuitbreaker in FIG. 1. If the comparator output $V_{70}$ is high, it will be de-energize relay coil $L_1$, indicating a fault condition; the contact CT will close upon de-energizing of the relay coil, and a fault signal will then be transmitted to the circuitbreaker which will switch off the load. The following truth table applies:

| V30 | V40 | V50 | V60 | V70 | Contact Ct | Fault Signal |
|---|---|---|---|---|---|---|
| High | High | High | High | Low | open | No |
| Low | Any | Any | Low | High | Closed | Yes |
| Any | Low | Any | Low | High | Closed | Yes |

-continued

| V30 | V40 | V50 | V60 | V70 | Contact Ct | Fault Signal |
| --- | --- | --- | --- | --- | --- | --- |
| Any | Any | Low | Low | High | Closed | Yes |

Figure 14:
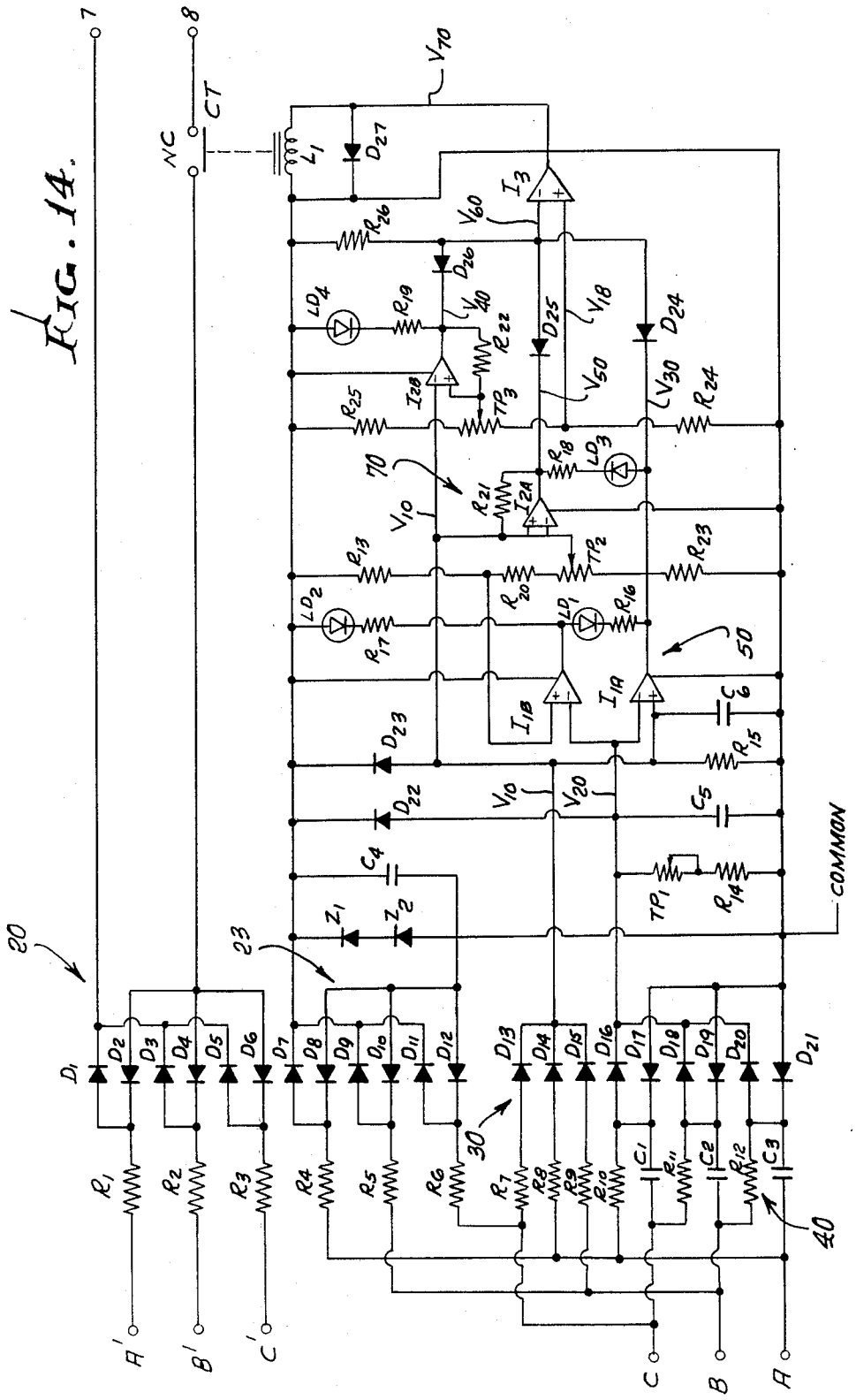
FIG. 14 is a full schematic of power monitor circuitry.

The capacitor $C_6$ in FIG. 14 is chosen so there will be a substantial time delay after power has been applied to the circuit until $V_{50}$ goes high. This assures that there will be a fault signal generated switching off the load upon return of power interruption.

A full schematic of the power monitor and fault signal transmitter is shown in FIG. 14.

Figure 3:
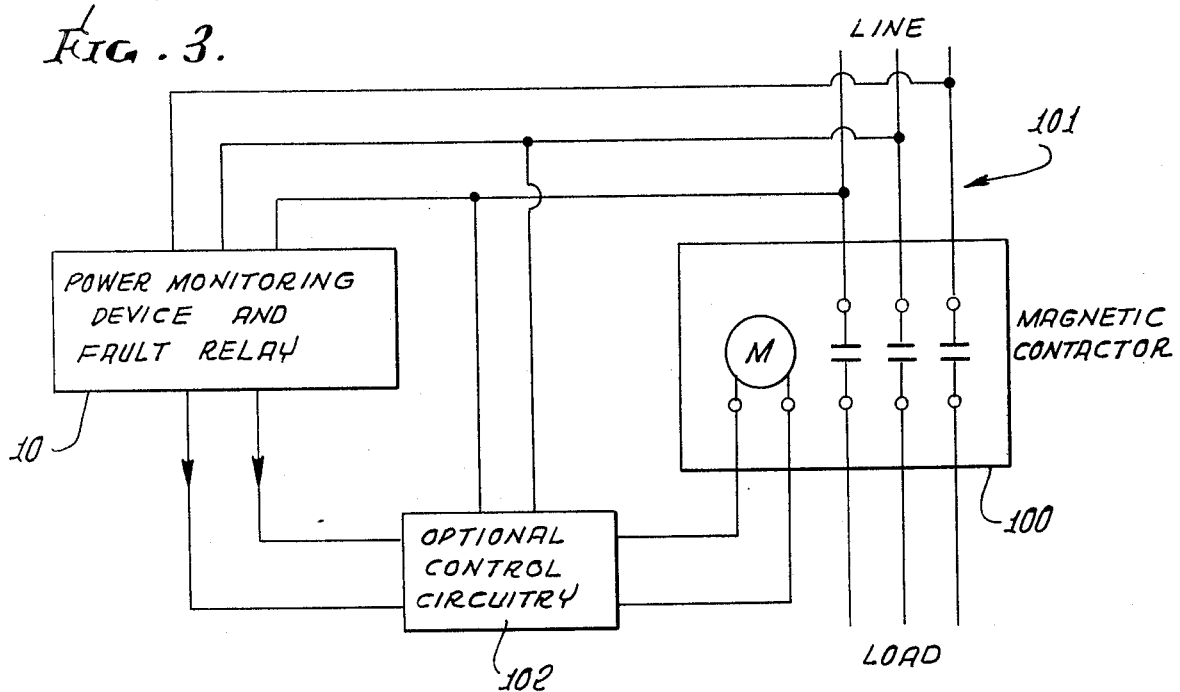
FIG. 3 shows a three-phase equipment protection system power monitor and magnetic contactor.

FIG. 3 shows application of the monitor 10 to magnetic contactor apparatus 100 connected between a three-phase power (lines 101) and a load, the connections being similar to those of FIG. 1. Optional auxiliary control circuit appear at 102.

Figure 4:
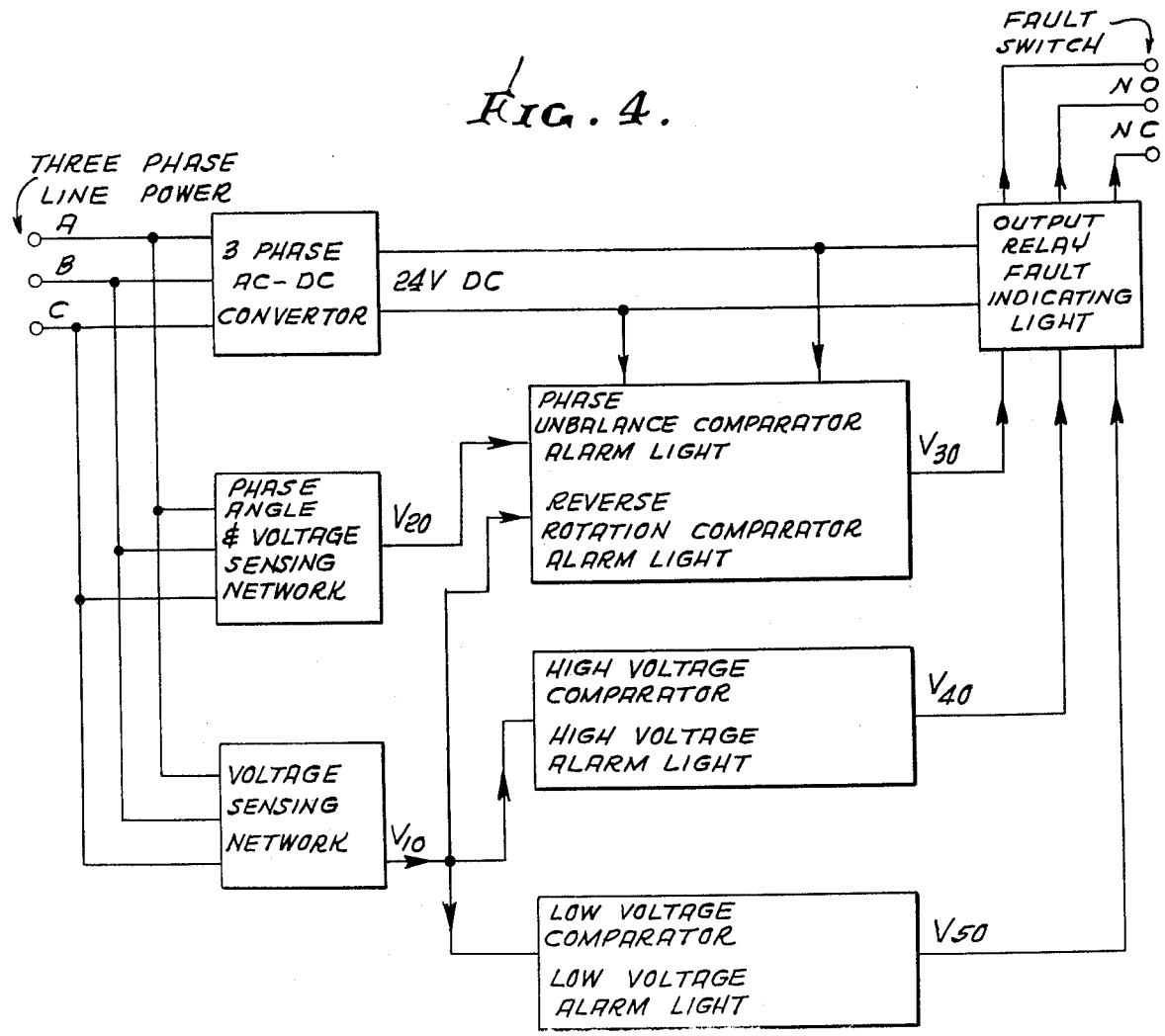
FIG. 4 is a block diagram of a power monitor and fault switching relay.

FIG. 4 is like FIG. 1, but omits converter 20.

Advantages and uses of the invention are as follows:

1. A single compact plug-in monitoring device to be used in three-phase electric circuits to detect:
    (a) Overvoltage
    (b) Undervoltage
    (c) Phase unbalance
    (d) Reverse rotation
    (e) Return of power after interruption
2. The use of three balanced RC circuits to detect phase unbalance and reverse rotation.
3. A delay system featured in the monitoring device which provides a fault signal during the first seconds of operation, dropping out the circuitbreaker on return of line power after power interruption.
4. The use of a floating reference signal to detect phase unbalance independently of voltage.
5. The use of four operational amplifiers in the monitoring device to compare a DC signal (proportional to the average three-phase voltage) with two fixed reference signals (representing high and low voltage limits) and one floating reference signal (representing phase unbalance and reverse rotation).
6. The use of four indicator lights to indicate high voltage, low voltage, reverse rotation, and single phasing.
7. The inclusion of a fault signal generator in the monitoring device
8. The use of a separate three-phase rectifier as a source for the fault signal to be generated.
9. The connection of the separate three-phase rectifier (power source to the fault signal generator) to the load side of the circuitbreaker permitting a fault signal to be generated only when the breaker is energized.
10. The connection of output of the fault signal generator to a voltage sensitive coil in a circuitbreaker.
11. The monitoring device with its fault signal generator is used in combination with a circuitbreaker to form a protective controller for three-phase equipment.
12. The plug-in monitoring device with a fault signal generator being connected in such a way that when it is removed from it socket, no signal will be going to the voltage sensitive coil of the circuitbreaker.

I claim:

1. In apparatus to monitor electrical three-phase power, the combination comprising
    (a) a three-phase voltage averaging detector to continuously monitor three-phase voltage, and to generate a DC voltage output ($V_{10}$) that is directly proportional to the average phase voltage, independent of phase sequence, and that is also inversely proportional to unbalance between any two phases,
    (b) a high voltage comparator circuit operatively connected with the $V_{10}$ output of the three-phase voltage averaging detector to compare said signal $V_{10}$ with a reference signal $V_{15}$, thereby to produce an output signal $V_{40}$,
    (c) and a low voltage comparator circuit operatively connected with output $V_{10}$ of the three-phase voltage averaging detector and also with a reference signal $V_{16}$ thereby to produce an output $V_{50}$,
    (d) and a fault-signal activator circuit coupled to $V_{40}$ and $V_{50}$ to produce a fault signal in the event either of $V_{40}$ and $V_{50}$ reaches a corresponding limit,
    (e) a three-phase voltage and phase sequence detector to continuously monitor the three-phase voltage and to generate a floating reference voltage $V_{20}$ that is proportional to the average three-phase voltage, that is also proportional to the unbalance between any two phases, and that is high for reverse rotation,
    (f) and circuitry connected to receive said $V_{10}$ and $V_{20}$ outputs and to produce output $V_{30}$ fed to the input of the activator circuit.

2. The combination of claim 1 wherein the high voltage comparator circuit comprises an amplifier having inputs for $V_{10}$ and $V_{15}$, and an indicator connected to the output $V_{40}$ of the amplifier to indicate when $V_{10}$ reaches a predetermined level relative to the reference voltage $V_{15}$.

3. The combination of claim 2 including means to adjust the level of $V_{15}$.

4. In apparatus to monitor electrical three-phase power, the combination comprising
    (a) a three-phase voltage averaging detector to continuously monitor three-phase voltage, and to generate a DC voltage output ($V_{10}$) that is directly proportional to the average phase voltage, independent of phase sequence, and that is also inversely proportional to unbalance between any two phases,
    (b) a high voltage comparator circuit operatively connected with the $V_{10}$ output of the three-phase voltage averaging detector to compare said signal $V_{10}$ with a reference signal $V_{15}$, thereby to produce an output signal $V_{40}$,
    (c) and a low voltage comparator circuit operatively connected with output $V_{10}$ of the three-phase voltage averaging detector and also with a reference signal $V_{16}$, thereby to produce an output $V_{50}$,
    (d) and a fault signal activator circuit coupled to $V_{40}$ and $V_{50}$ to produce a fault signal in the event either of $V_{40}$ and $V_{50}$ reaches a corresponding limit,
    (e) a three-phase voltage and phase sequence detector to continuously monitor the three-phase voltage and to generate a floating reference voltage $V_{20}$ that is proportional to the average three-phase voltage, that is also proportional to the unbalance between any two phases, and that is high for reverse rotation,
    (f) a phase unbalance and reverse phase sequence comparator circuit operatively connected to receive said $V_{10}$ and $V_{20}$ outputs, and to produce an output $V_{30}$ fed to the input of the fault signal activator circuit, whereby a predetermined low value of $V_{30}$ will cause production of a fault signal, (g) said three-phase voltage and phase sequence detector comprising an RC and diode network including $R_{10}$ and $D_{16}$ in series in a first phase branch, $R_{11}$ and $D_{18}$ in series in another phase branch, $R_{12}$ and $D_{20}$ in series in a further phase branch, $C_1$ connected between $R_{10}$ and another phase branch, $C_2$ between $R_{11}$ and said further phase branch, and $C_3$ connected between $R_{12}$ and said first phase branch, one terminal for $V_{20}$ connected with each of said diodes $D_{16}$, $D_{18}$, and $D_{20}$.

5. In apparatus to monitor electrical three-phase power, the combination comprising
(a) a three-phase voltage averaging detector to continuously monitor three-phase voltage, and to generate a DC voltage output ($V_{10}$) that is directly proportional to the average phase voltage, independent of phase sequence, and that is also inversely proportional to unbalance between any two phases,
(b) a high voltage comparator circuit operatively connected with the $V_{10}$ output of the three-phase voltage averaging detector to compare said signal $V_{10}$ with a reference signal $V_{15}$, thereby to produce an output signal $V_{40}$,
(c) and a low voltage comparator circuit operatively connected with output $V_{10}$ of the three-phase voltage averaging detector and also with a reference signal $V_{16}$ thereby to produce an output $V_{50}$,
(d) and a fault signal activator circuit coupled to $V_{40}$ and $V_{50}$ to produce a fault signal in the event either of $V_{40}$ and $V_{50}$ reaches a corresponding limit,
(e) a three-phase voltage and phase sequence detector to continuously monitor the three-phase voltage and to generate a floating reference voltage $V_{20}$ that is proportional to the average three-phase voltage, that is also proportional to the unbalance between any two phases, and that is high for reverse rotation,
(f) and including a phase unbalance and reverse phase sequence comparator circuit operatively connected to receive said $V_{10}$ and $V_{20}$ outputs, and produce an output $V_{30}$ fed to the input of the fault signal activator circuit, whereby a predetermined low value of $V_{30}$ will cause production of a fault signal.

6. The combination of claim 5 wherein said phase unbalance and reverse phase sequence comparator circuit comprises a first amplifier having inputs for $V_{10}$ and $V_{20}$, and a second amplifier having inputs for $V_{20}$ and a reference voltage $V_{17}$, and indicators connected with the outputs of the amplifiers to respectively indicate phase unbalance and to indicate phase reversal.

7. The combination of claim 5 wherein the low voltage comparator circuit comprises an amplifier having inputs for $V_{10}$ and $V_{16}$, and an indicator connected with the output $V_{50}$ of the amplifier to indicate when $V_{10}$ reaches a predetermined level relative to $V_{16}$.

8. The combination of claim 7 including means to adjust the level of $V_{16}$.

9. The combination of claim 5 including a switch connected in series with at least one line transmitting said three-phase power, and also operatively connected with said fault signal activator circuit to interrupt power transmission in response to a fault signal transmitted if any of said outputs $V_{30}$, $V_{10}$ and $V_{50}$ reaches a predetermined limit.

10. A single compact plug-in monitoring device connected with a three-phase electric circuit and having phase angle and voltage detection circuitry and comparator circuitry connected therewith to detect
(a) overvoltage
(b) undervoltage
(c) phase unbalance
(d) phase reverse rotation
(e) return a power after interruption, said comparator circuitry including a phase unbalance and reverse rotation comparator having three balanced RC circuits, and there being means operatively connected to said comparator circuitry to provide a fault signal during the first seconds of operations, for dropping out a circuitbreaker on return of line power after power interruption,
(f) said comparator circuitry including two additional comparators having operational amplifiers to compare a DC signal (proportional to the average three-phase voltage) with two fixed reference signals (representing high and low voltage limits) and one floating reference signal (representing phase unbalance and reverse rotation).

11. The device of claim 10 having a fault signal generator operatively connected to said comparator circuitry.

12. The device of claim 11 having an indicating light operatively connected to said fault signal generator to indicate a fault condition.

13. The device of claim 11 wherein the generator includes a three-phase rectifier as a source for the fault signal to be generated.

14. The device of claim 13 wherein the three-phase rectifier is connected to the load side of a circuitbreaker permitting a fault signal to be generated only when the breaker is energized.

15. The device of claim 11 wherein the fault signal generator is connected to a voltage sensitive coil in a circuitbreaker.

16. The device of claim 15 wherein the fault signal generator is connected to a socket so that when it is removed from said socket, no signal will pass to the voltage sensitive coil of the circuitbreaker.

17. The device of claim 11 wherein the fault signal generator is connected in combination with a circuitbreaker to form a protective controller for three-phase equipment.

* * * * *